US011738569B2

(12) United States Patent
Ueda

(10) Patent No.: US 11,738,569 B2
(45) Date of Patent: Aug. 29, 2023

(54) EDITOR, EDITING SYSTEM, AND NON-TRANSITORY COMPUTER-READABLE STORAGE MEDIUM

(71) Applicant: BROTHER KOGYO KABUSHIKI KAISHA, Nagoya (JP)

(72) Inventor: Hideaki Ueda, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 111 days.

(21) Appl. No.: 17/206,144

(22) Filed: Mar. 19, 2021

(65) Prior Publication Data

US 2021/0300062 A1    Sep. 30, 2021

(30) Foreign Application Priority Data

Mar. 25, 2020  (JP) .............................. JP2020-054685

(51) Int. Cl.
*G06F 3/12* (2006.01)
*B41J 3/407* (2006.01)
*B41J 3/46* (2006.01)
*H04N 1/60* (2006.01)
*G06F 3/14* (2006.01)
*G09G 5/02* (2006.01)

(52) U.S. Cl.
CPC .............. *B41J 3/4075* (2013.01); *B41J 3/46* (2013.01); *G06F 3/1208* (2013.01); *G06F 3/1256* (2013.01); *G06F 3/14* (2013.01); *G09G 5/02* (2013.01); *H04N 1/60* (2013.01)

(58) Field of Classification Search
CPC .......... G09G 5/02; G06F 3/14; G06F 3/1256; G06F 3/1208; H04N 1/60; B41J 3/4075; B41J 3/46
See application file for complete search history.

(56) References Cited

U.S. PATENT DOCUMENTS

| 8,866,861 | B2 * | 10/2014 | Schuh ................... B41J 3/4075 |
| | | | 347/116 |
| 2004/0189733 | A1 | 9/2004 | Yamamoto et al. |
| 2005/0105104 | A1 | 5/2005 | Sakai et al. |
| 2018/0089902 | A1 * | 3/2018 | Zhu .......................... G06T 7/73 |
| 2019/0235432 | A1 | 8/2019 | Kawai |

FOREIGN PATENT DOCUMENTS

| JP | 2004-299177 | A | 10/2004 | |
| JP | 2012-40879 | A | 3/2012 | |
| JP | 2019-53586 | A | 4/2019 | |
| JP | 2019-130891 | A | 8/2019 | |
| WO | WO-2019203838 | A1 * | 10/2019 | ......... B65C 11/0289 |

* cited by examiner

*Primary Examiner* — Antonio A Caschera
(74) *Attorney, Agent, or Firm* — Kenealy Vaidya LLP

(57) ABSTRACT

An editor controls a display of an edit screen for editing a print content to a tape to prepare a label having an object printed on the tape and a light transmission at least in a part of the label. A controller of the editor displays a label frame indicative of an outer shape of the label on the edit screen, designates a color of a substrate on which the label is arranged, displays an area in the label frame corresponding to a first part having a light transmission of the label with a color of the substrate designated in the substrate color designating processing, and displays the object in the area.

6 Claims, 8 Drawing Sheets

EDITOR, EDITING SYSTEM, AND NON-TRANSITORY COMPUTER-READABLE STORAGE MEDIUM

CROSS-REFERENCE TO RELATED APPLICATION

This application is based upon and claims the benefit of priority from prior Japanese patent application No. 2020-054685, filed on Mar. 25, 2020, the entire contents of which are incorporated herein by reference.

TECHNICAL FIELD

The present disclosure relates to a technology of editing a print content for a label.

BACKGROUND

An editor for editing a print content to a label is already known. For example, an editor disclosed in JP-A-2019-053586 displays a label outer frame and an object on an edit screen, thereby displaying an edited result of a print content to a user.

In the editor as described above, a color in the label outer frame is a color of the label. For this reason, for example, in a case where the label is transparent, a color in the label outer frame becomes a background color of the edit screen. In this case, when a transparent label printed according to the edited result of the print content is actually arranged on a substrate, an appearance of the label arranged on the substrate may be different from an appearance of the label according to the edited result of the print content on the edit screen due to a difference between the background color of the edit screen and the color of the substrate.

SUMMARY

An object of the present disclosure is to provide a technology of editing a print content for a label, which enables to suppress a difference in appearance between a label according to an edited result of the print content and a label arranged on a substrate.

A first aspect of the present disclosure is an editor including:

a controller configured to control a display of an edit screen for editing a print content to a tape to prepare a label having an object printed on the tape and a light transmission at least in a part of the label, in which the controller is configured to perform:
frame display processing of displaying, on the edit screen, a label frame indicative of an outer shape of the label;
substrate color designating processing of designating a color of a substrate on which the label is arranged;
substrate color display processing of displaying an area in the label frame corresponding to a first part having a light transmission of the label with a color of the substrate designated in the substrate color designating processing; and
object display processing of displaying the object in the area.

According to the first aspect, the area in the label frame corresponding to the first part of the label is displayed with the designated color of the substrate. That is, in the edited result of the print content on the edit screen, the color of the substrate is reflected in the area in the label frame corresponding to the first part of the label. For this reason, when the prepared label is actually arranged on the substrate, both a background color of the object in the first part and a color of the area in the label frame, which corresponds to the first part of the label, in the edited result of the print content on the edit screen become the same color, which is the color of the substrate. Therefore, the editor can suppress a difference in appearance between the label according to the edited result of the print content and the label arranged on the substrate.

In the editor according to the first aspect, the tape may be configured by the first part and a second part having no light transmission, the first part and the second part extending in an elongated direction of the tape and being arranged side by side in a width direction of the tape. In this case, the editor can diversify uses of the label.

In the editor according to the first aspect, the controller may perform object color acquisition processing of acquiring a color of the object, and specifying processing of specifying a display color according to a color of the object acquired in the object color acquisition processing and a color of the substrate designated in the substrate color designating processing. The controller may perform the object display processing to display the object with the display color specified in the specifying processing. In this case, in the edited result of the print content on the edit screen, the color of the substrate is reflected on the object in the area corresponding to the first part of the label. Therefore, the editor can make the appearance of the label according to the edited result of the print content closer to the appearance of the label arranged on the substrate.

In the editor according to the first aspect, the controller may perform image acquisition processing of acquiring an image captured by a camera, and perform the substrate color designating processing to designate a color of the substrate based on the image acquired in the image acquisition processing. In this case, the editor can handle many types of substrates.

A second aspect of the present disclosure is an editing system including:
the editor according to the first aspect; and
a camera,
in which a controller is configured to control a display of an edit screen for editing a print content to a tape to prepare a label having an object printed on the tape and a light transmission at least in a part of the label,
a controller of the editor is configured to perform image acquisition processing of acquiring an image captured by the camera, and
the controller is configured to perform the substrate color designating processing to designate a color of a substrate on which the label is arranged based on the image acquired in the image acquisition processing. The second aspect can achieve the similar effects to the first aspect.

A third aspect of the present disclosure is a non-transitory computer-readable storage medium storing a computer program, when executed by a computer of an editor configured to control a display of an edit screen for editing a print content to a tape to prepare a label having an object printed on the tape and a light transmission at least in a part of the label, the computer program being configured to cause the editor to perform:
frame display processing of displaying, on the edit screen, a label frame indicative of an outer shape of the label:
substrate color designating processing of designating a color of a substrate on which the label is arranged;
substrate color display processing of displaying an area in the label frame corresponding to a first part having a light transmission of the label with a color of the substrate designated in the substrate color designating processing; and object display processing of displaying the object in the area. The third aspect can achieve the similar effects to the first aspect.

DETAILED DESCRIPTION

Figure 1:
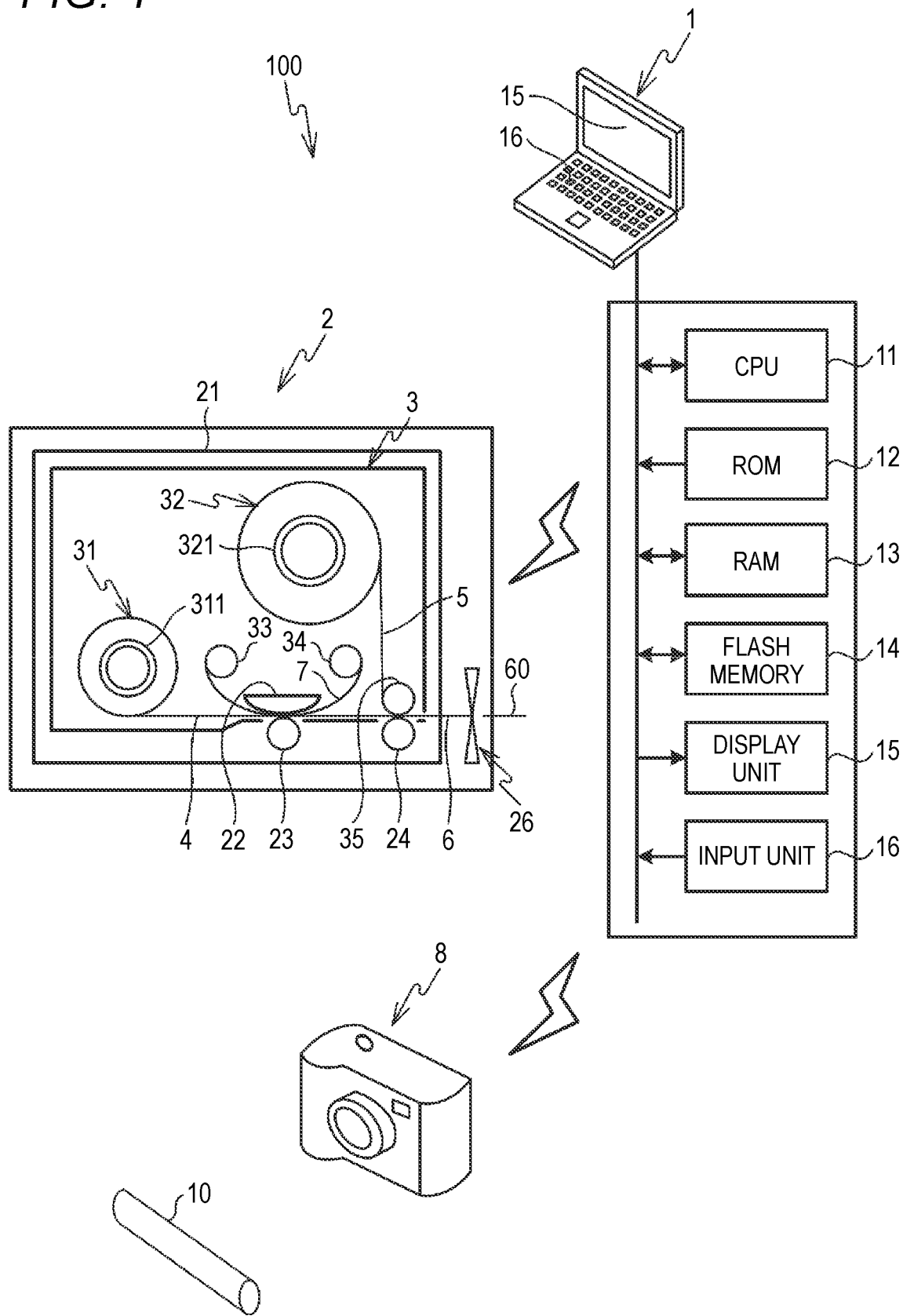
FIG. 1 depicts a schematic configuration of a printing system 100.

A printing system 100 in accordance with an embodiment of the present disclosure will be described with reference to the drawings. The drawings are used so as to describe technical features that can be adopted by the present disclosure. That is, the configurations and controls of the apparatus shown in the drawings are not intended to be limited thereto, and are just explanatory examples.

An outline of the printing system 100 is described with reference to FIG. 1. The printing system 100 is configured by an editor 1, a printer 2 and a digital camera 8. The editor 1 is, for example, a personal computer, and can communicate with each of the printer 2 and the digital camera 8 in a wired or wireless manner. The editor 1 is configured to edit a print content to a print tape 4 and to transmit print data based on the edited print content to the printer 2. The printer 2 is configured to print an object on the print tape 4, based on the print data transmitted from the editor 1, thereby preparing a printed label 6. The printer 2 is configured to prepare a label 60 by cutting the prepared label 6. In the present embodiment, the "object" is configured by one or more characters, figures, symbols, and the like.

The prepared label 60 is bonded to a cable 10. The cable 10 is a kind of a substrate that is a bonding target of the label 60. The digital camera 8 is used so as to capture the cable 10, and can transmit a captured image of the cable 10 to the editor 1. Although described in detail later, the editor 1 can specify a color of the cable 10, based on the image of the cable 10 acquired from the digital camera 8.

An electrical configuration of the editor 1 is described with reference to FIG. 1. The editor 1 includes a CPU 11, a ROM 12, a RAM 13, a flash memory 14, a display unit 15, and an input unit 16, which are connected to each other. The CPU 11 functions as a processor, and is configured to control the editor 1. In the ROM 12, a main program for the CPU 11 to perform main processing (refer to FIG. 4) (which will be described later), information necessary for the CPU 11 to execute the main program, and the like are stored. In the RAM 13, a variety of data and the like that are referred to by the CPU 11 in the main processing are temporarily stored. In the flash memory 14, print data and the like necessary for printing are stored. The display unit 15 is configured to display an edit screen 150 (refer to FIG. 5), a color setting screen 160 (refer to FIG. 7) and the like, which will be described later. The input unit 16 is operated by a user, and is configured to output a signal corresponding to the operation to the CPU 11.

A mechanical configuration of the printer 2 is described with reference to FIG. 1. The printer 2 includes a mounting part 21. A tape cassette 3 is detachably mounted to the mounting part 21. In the tape cassette 3, a first tape roll 31, a second tape roll 32, a ribbon roll 33, a ribbon winding spool 34, and a pressing roller 35 are provided.

The first tape roll 31 has a configuration where a print tape 4 is wound on a first spool 311. The second tape roll 32 has a configuration where a bonding tape 5 is wound on a second spool 321. The ribbon roll 33 has a configuration where an ink ribbon 7 is wound on a ribbon spool (not shown). The ink ribbon 7 extends over the ribbon roll 33 and the ribbon winding spool 34. The ribbon winding spool 34 is configured to wind the ink ribbon 7 used for print. The pressing roller 35 is exposed to an outside from the tape cassette 3.

The mounting part 21 is provided with a thermal head 22, a platen roller 23, and a pressing roller 24. The thermal head 22 is configured to transfer ink 71 (refer to FIG. 2) from the ink ribbon 7 to the print tape 4 for printing. The platen roller 23 is configured to sandwich the print tape 4 between the platen roller and the thermal head 22, and to rotate, thereby pulling out and conveying the print tape 4 from the first tape roll 31.

The pressing roller 24 is configured to sandwich the print tape 4 and the bonding tape 5 between the pressing roller 24 and the pressing roller 35, and to press the bonding tape 5 to a print surface 41 (refer to FIG. 2) of the print tape 4, thereby preparing the label 6. The pressing rollers 24 and 35 are configured to rotate, thereby pulling out the bonding tape 5 from the second tape roll 32 and conveying the prepared label 6. The cutter 26 is provided on a further downstream side than the pressing roller 24 with respect to a conveying direction of the label 6. The cutter 26 is configured to cut the label 6.

According to the above configuration, a controller (not shown) of the printer 2 performs print operations, as follows. The platen roller 23 rotates, so that the print tape 4 is pulled out from the first tape roll 31. The ink 71 is transferred from the ink ribbon 7 to the pulled out print tape 4 by the thermal head 22, so that an object is printed. Therefore, a color of the object is a color of the ink 71.

The bonding tape 5 is pulled out from the second tape roll 32. The printed print tape 4 is pressed to the pulled out bonding tape 5 by the pressing rollers 24 and 35. Thereby, the printed label 6 is prepared. The label 6 is cut by the cutter 26, so that the label 60 is prepared.

Figure 2:
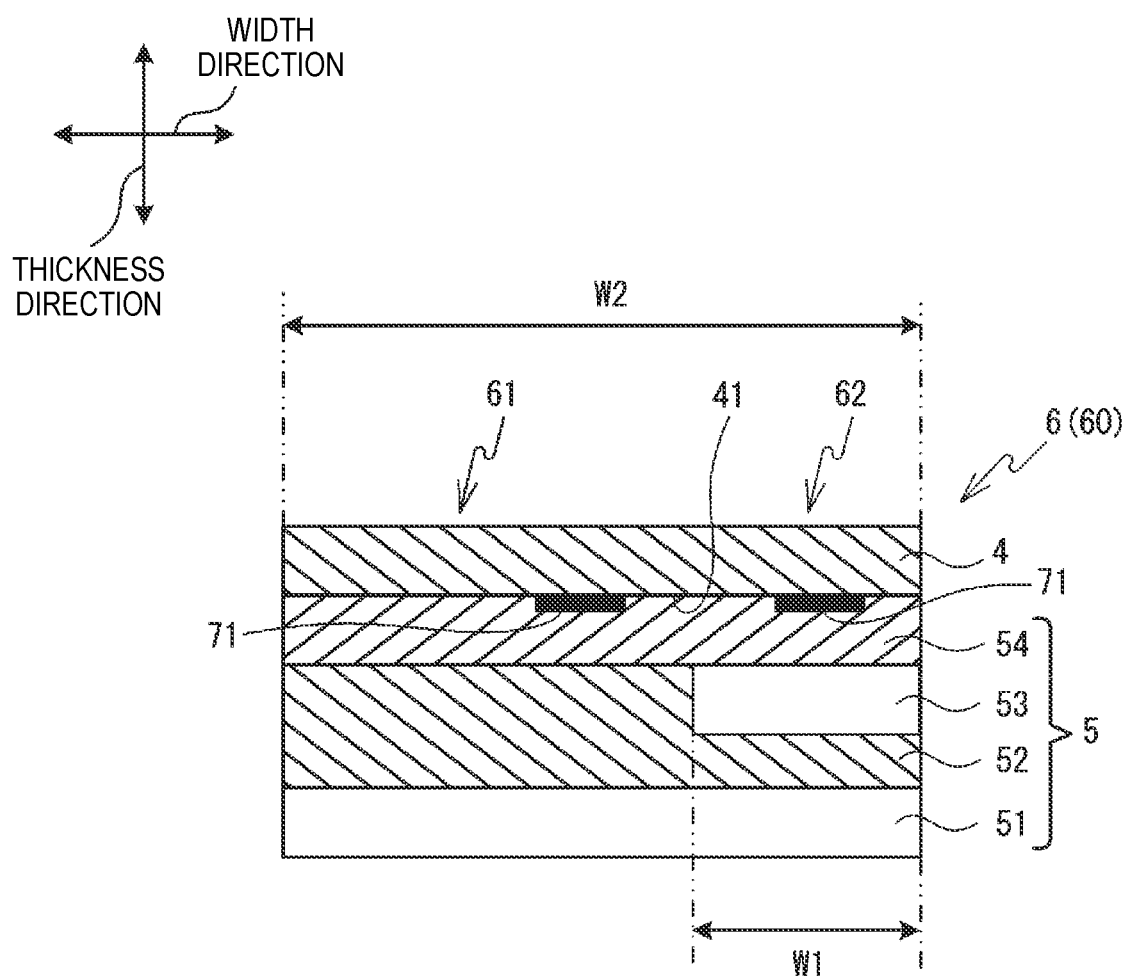
FIG. 2 is a pictorial view of a label 6, as seen in an elongated direction.

A detailed structure of the label 6 is described with reference to FIG. 2. Hereinbelow, an elongated direction of the label 6 is simply referred to as "elongated direction", a width direction of the label 6 is simply referred to as "width direction", and a thickness direction of the label 6 is simply referred to as "thickness direction". In FIG. 2, the right and left direction, the upper and lower direction and the direction orthogonal to the drawing sheet are each the width direction, the thickness direction, and the elongated direction.

As described above, the label 6 is prepared by pressurizing the printed print tape 4 and the bonding tape 5 each other. The print tape 4 is a transparent film tape having an elongated shape. In the present embodiment, "transparent" is a property of a medium by which an object or a print content on a backside of the medium can be visually recognized from a surface side of the medium, and includes colorless transparent, colored transparent, colorless translucent and colored translucent. That is, "transparent" refers to a property of a medium having a light transmission. Hereinbelow, a property of a medium having no light transmission is referred to as "opaque". In FIG. 2, the transparent medium is shown with diagonal lines, and the opaque medium is shown with a solid color.

The bonding tape 5 is a two-sided adhesive tape having an elongated shape, and is configured by a release paper 51, an adhesive layer 52, a ground paper 53, and an adhesive layer 54 stacked in corresponding order in the thickness direction. The release paper 51 is releasably bonded to the ground paper 53 via the adhesive layer 52. The adhesive layer 52 is transparent, and is provided on an entire surface of one side of the ground paper 53. The adhesive layer 54 is transparent, and is provided on an entire surface of the other side of the ground paper 53. The ground paper 53 is opaque. A width W1 of the ground paper 53 is smaller than a width W2 of the print tape 4, and, in the present embodiment, is smaller than a half of the width W2 of the print tape 4. The bonding tape 5 is bonded to a print surface 41 of the print tape 4 from the adhesive layer 54-side, so that the label 6 is configured.

Since the ground paper 53 is opaque, a part (hereinbelow, referred to as "opaque part 62") of the label 6 corresponding to the ground paper 53 is opaque in the thickness direction. Since the width W1 of the ground paper 53 is smaller than the width W2 of the print tape 4, the label 6 is provided with a part (hereinbelow, referred to as "transparent part 61") in which the ground paper 53 is not provided in the thickness direction. Since the adhesive layer 52, the adhesive layer 54 and the print tape 4 are transparent, the transparent part 61 is transparent in the thickness direction in a state where the release paper 51 is peeled off from the label 6. The transparent part 61 and the opaque part 62 are aligned in the width direction, and extend in the elongated direction. The label 6 configured as described above is cut in the width direction in a predetermined position in the elongated direction, so that the label 60 is prepared.

Figure 3A:
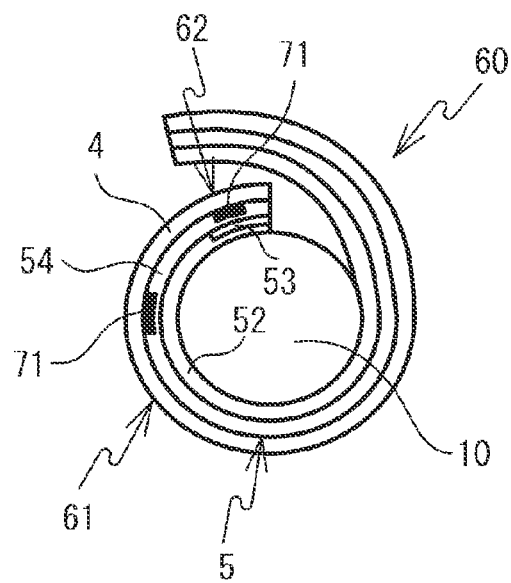
FIGS. 3A and 3B are pictorial views for illustrating an example of a using method of a label 60.

An example of a using method of the label 60 is described with reference to FIGS. 3A and 3B. FIG. 3A depicts the label 60 that is being bonded to the cable 10, as seen in an axis direction of the cable 10. As shown in FIG. 3A, a user peels off the release paper 51 (refer to FIG. 2) from the label 60. The user bonds the label 60 so as to wrap it around the cable 10 with arranging the exposed adhesive layer 52 on an inner side. In this case, when a length of the label 60 in the width direction is longer than a length of an outer periphery of the cable 10, the label 60 can be wrapped so that the transparent part 61 covers the opaque part 62 from above.

Figure 3B:
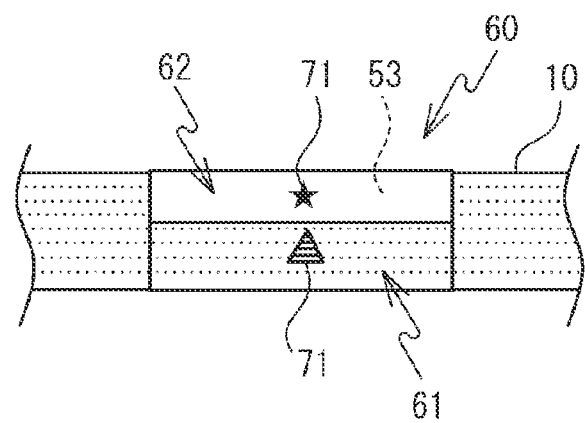

FIG. 3B depicts the label 60 bonded to the cable 10, as seen in a leftward obliquely upper direction in FIG. 3A. In FIG. 3B, a color of the cable 10 is shown with the dotted line, and a color of the ground paper 53 is shown with a solid color. As shown in FIG. 3B, when seeing the label 60 bonded to the cable 10, the user visually recognizes an object "▲" printed on the label 60 with the cable 10 as a background in the transparent part 61, and visually recognizes an object "★" printed on the label 60 with the ground paper 53 as a background in the opaque part 62.

As described above, in the present embodiment, the color of the ink 71 transferred to the print tape 4 is the color of the object. The ink 71 transferred to the print tape 4, i.e., the object has a light transmission by a material, an amount of transfer and the like of the ink 71. Therefore, when the cable 10 is used as a background, the object "▲" of the transparent part 61 looks like a color in which the color of the cable 10 and the color of the ink 71 are mixed according to transparency (i.e., light transmittance) of the object. In FIG. 3B, the color in which the color of the cable 10 and the color of the ink 71 are mixed according to transparency of the object is expressed by horizontal lines in the object "▲" of the transparent part 61. Note that, when the object is opaque, the object of the transparent part 61 looks like the same color as the color of the ink 71.

As an example, a case where the transparent part 61 is colorless transparent, the cable 10 is blue, the ground paper 53 is white, and the ink 71 is black with a light transmission is described. In this case, a background of the transparent part 61 is blue of the cable 10, and a background of the opaque part 62 is white of the ground paper 53. An object of the transparent part 61 looks like a color as if blue of the cable 10 and black of the ink 71 are mixed.

Main processing is described with reference to FIGS. 4 to 8. When an instruction to perform main processing is input to the editor 1 via the input unit 16, the CPU 11 reads out a main program from the ROM 12 and operates to perform the main processing.

Figure 4:
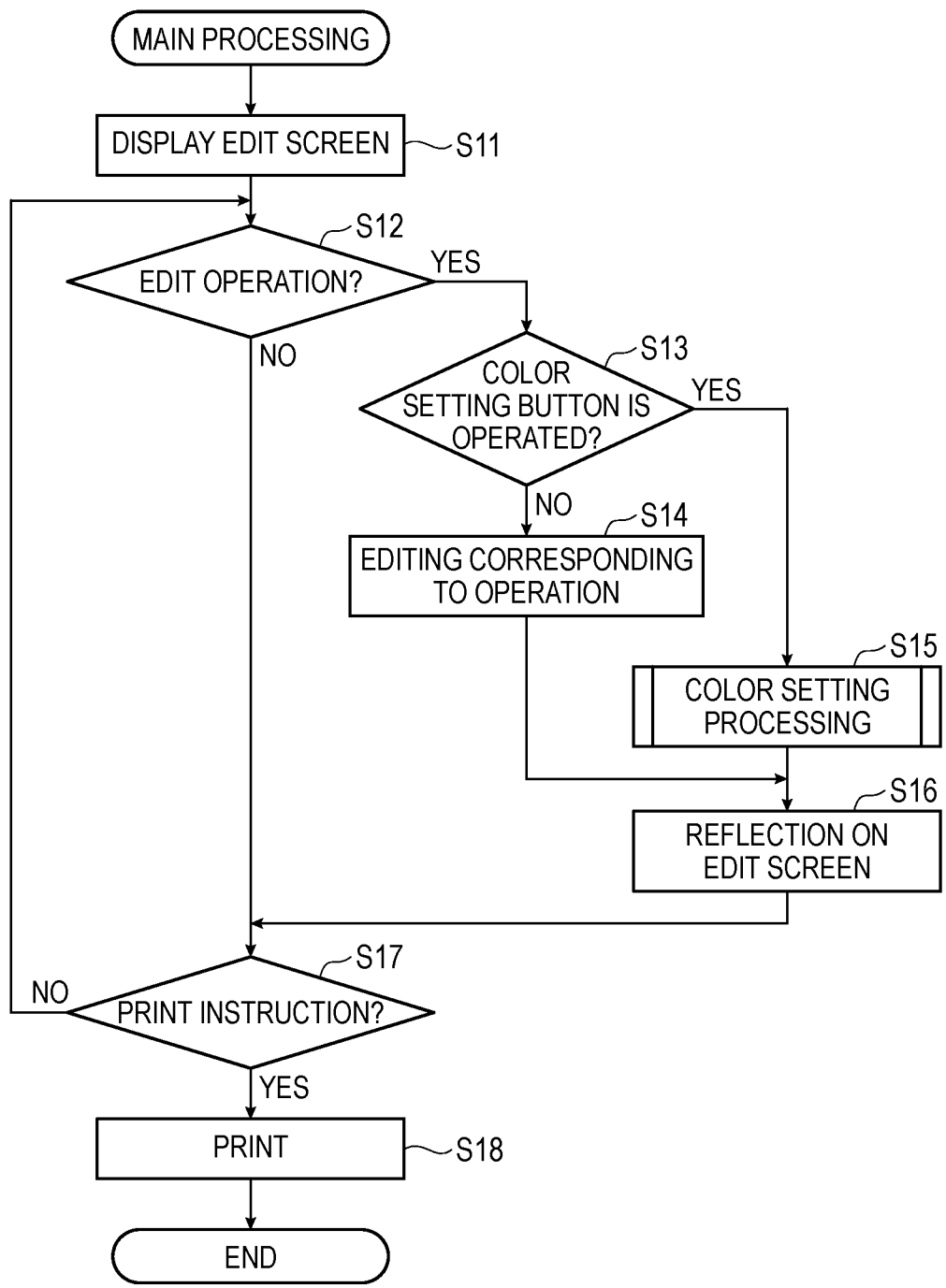
FIG. 4 is a flowchart of main processing.
Figure 5:
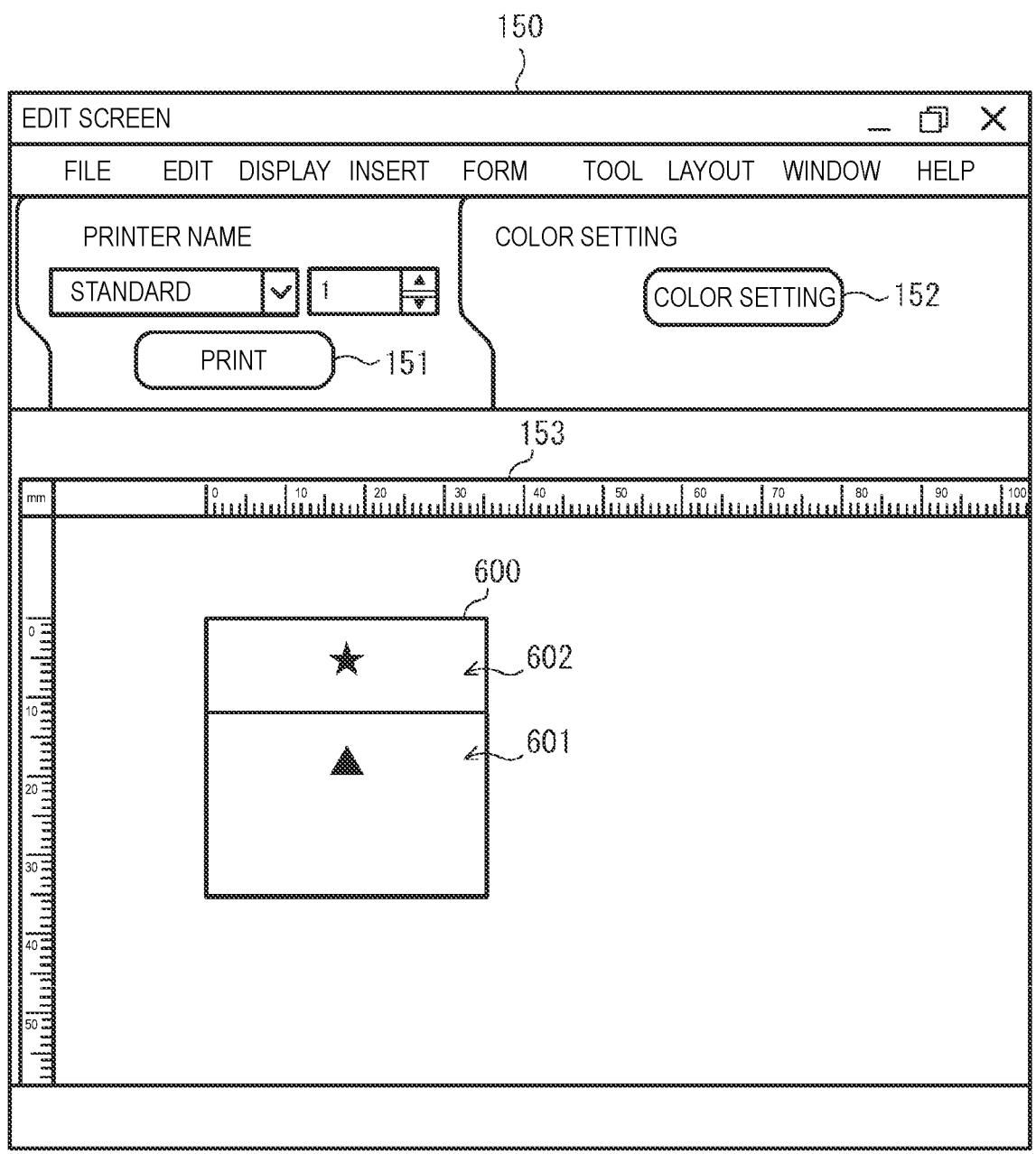
FIG. 5 illustrates an example of an edit screen 150.

As shown in FIG. 4, when the main processing starts, the CPU 11 displays an edit screen 150 (refer to FIG. 5) on the display unit 15 (S11). The user edits a print content for preparing the label on the edit screen 150. As shown in FIG. 5, the edit screen 150 includes a print button 151, a color setting button 152, and a preview area 153. The print button 151 is provided at a left upper part of the edit screen 150, and is operated via the input unit 16, thereby inputting a print instruction for performing printing by the printer 2 to the editor 1. The color setting button 152 is provided at a right upper part of the edit screen 150, and is operated via the input unit 16, thereby displaying a color setting screen 160 (refer to FIG. 7) (which will be described later).

The preview area 153 is provided at a substantially lower half part of the edit screen 150, and displays a preview of the label 60 that is to be prepared. In S11, a default preview of the label 60 is displayed. Specifically, a label frame 600 is displayed in the preview area 153. The label frame 600 shows an outer shape of the label 60.

An area in the label frame 600 is configured by a transparent area 601 and an opaque area 602. The transparent area 601 corresponds to the transparent part 61 of the label 60. The opaque area 602 corresponds to the opaque part 62 of the label 60. Lengths of the transparent area 601 and the opaque area 602 in a width direction (a vertical direction in FIG. 5) are different depending on a type of the label 6. As the type of the label 6, a plurality of types is stored in the flash memory 14, and any one is selected as the user operates the input unit 16.

In the label frame 600, objects to be printed are displayed. In the example of FIG. 5, as the object, "▲" is arranged in the transparent area 601 in the label frame 600, and "★" is arranged in the opaque area 602 in the label frame 600. When an input operation for inputting an object is received from the input unit 16, the CPU 11 arranges an object corresponding to the input operation in a position in the label frame 600 corresponding to the input operation.

As shown in FIG. 4, the CPU 11 determines whether an edit operation for editing the print content is received from the input unit 16 (S12). The edit operation includes an operation of selecting a content of the object, an operation of selecting a color of the object, an operation of selecting a type of the label 6, an operation of performing a color setting to be described later, and the like.

When it is determined that there is no edit operation (S12: NO), the CPU 11 proceeds to S17. When it is determined that there is an edit operation (S12: YES), the CPU 11 determines whether the received edit operation is an operation of the color setting button 152 (refer to FIG. 5) (S13).

When it is determined that the received edit operation is not an operation of the color setting button 152 (S13: NO), the CPU 1 performs editing according to the received edit operation (S14). For example, when there is an operation of selecting a content of the object, the CPU 11 changes a content of the object and stores the changed content in the RAM 13. When there is an operation of selecting a color of the object, the CPU 11 changes a color of the object and stores the changed color in the RAM 13. When there is an operation of selecting a type of the label 6, the CPU 11 changes a type of the label 6 and stores the changed type in the RAM 13. Then, the CPU 11 proceeds to S16.

When it is determined that the received edit operation is an operation of the color setting button 152 (S13. YES), the CPU 11 performs color setting processing (refer to FIG. 6) (S15), and proceeds to S16. In the color setting processing, a color of the substrate is designated, and a display color of the object is specified based on the color of the substrate and the color of the object.

The color setting processing is described with reference to FIG. 6. When the color setting processing starts, the CPU 11 displays a color setting screen 160 (refer to FIG. 7) on the display unit 15 (S20). As shown in FIG. 7, the color setting screen 160 includes a substrate color designating area 161, a background color designating area 162, an image acquisition instruction button 163, and an OK button 164. The substrate color designating area 161 is provided at a left upper part of the color setting screen 160, and is operated via the input unit 16, thereby designating a color of the substrate (for example, the cable 10). In FIG. 7, a designated color of the substrate is shown with dotted lines. However, actually, a color of the substrate such as red and blue is displayed. The background color designating area 162 is provided at the right of the substrate color designating area 161, and is operated via the input unit 16, thereby designating a color of the ground paper 53.

The image acquisition instruction button 163 is provided at a center of the color setting screen 160, and is operated via the input unit 16, thereby inputting an acquisition instruction for acquiring an image from the digital camera 8 to the editor 1. The OK button 164 is provided at a right lower part of the color setting screen 160, and is operated via the input unit 16, thereby fixing a change content of diverse colors and ending the color setting processing.

Figure 6:
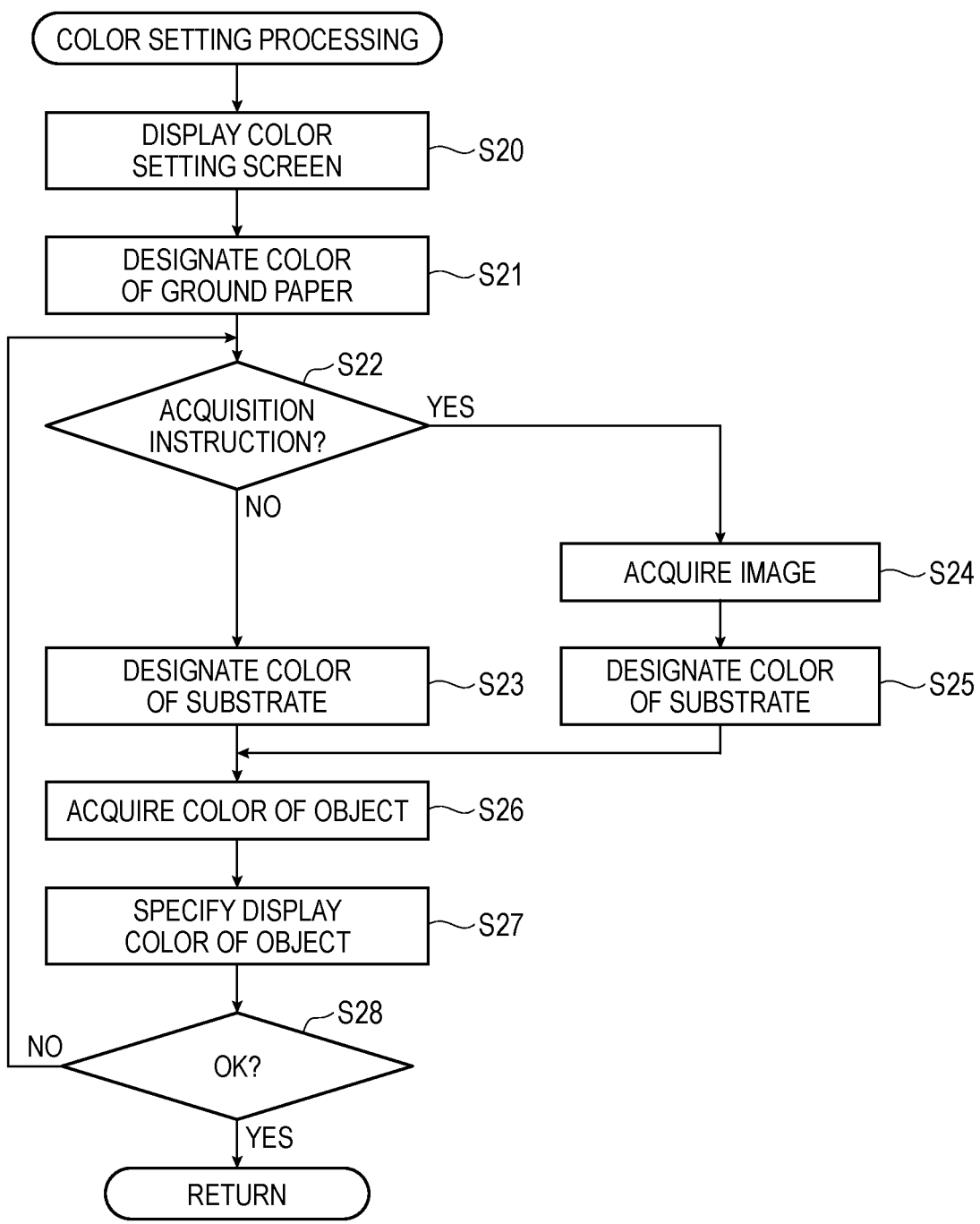
FIG. 6 is a flowchart of color setting processing.
Figure 7:
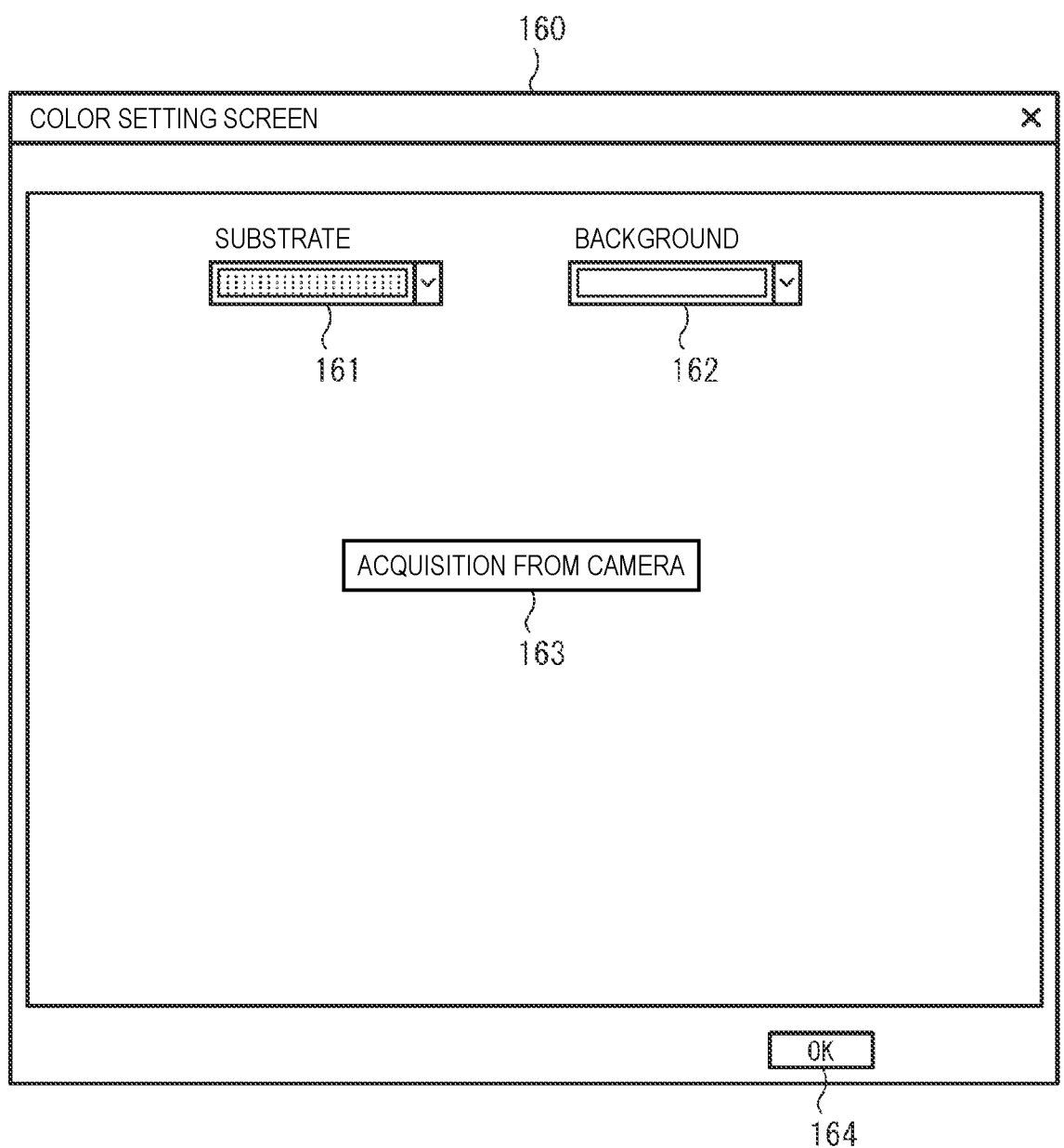
FIG. 7 illustrates an example of a color setting screen 160.

As shown in FIG. 6, the CPU 11 designates a color of the ground paper 53 according to an operation on the background color designating area 162 (refer to FIG. 7) via the input unit 16, and stores the same in the RAM 13 (S21). The CPU 11 determines whether an acquisition instruction is received (S22). The user operates the image acquisition instruction button 163 (refer to FIG. 7) via the input unit 16, thereby inputting an acquisition instruction to the editor 1. When it is determined that there is no acquisition instruction (S22: NO), the CPU 11 designates a color of the substrate according to an operation on the substrate color designating area 161 via the input unit 16, and stores the same in the RAM 13 (S23). Then, the CPU 11 proceeds to S26.

When it is determined that there is an acquisition instruction (S22: YES), the CPU 11 acquires an image from the digital camera 8 (S24). Specifically, the user captures the substrate in advance by the digital camera 8. A CPU (not shown) of the digital camera 8 stores the captured image data in a flash memory (not shown) of the digital camera 8. The CPU 11 transmits a command to request the image data to the digital camera 8. The CPU of the digital camera 8 transmits the image data to the editor 1, in response to the command. Thereby, the CPU 11 acquires the image of the substrate from the digital camera 8.

The CPU 11 designates a color of the substrate, based on the acquired image, and stores the same in the RAM 13 (S25). Specifically, the CPU 11 specifies a color of the substrate from the acquired image by well-known image recognition technology, and stores the same in the RAM 13. Then, the CPU 11 proceeds to S26. The CPU 11 acquires a color of the object selected by an operation of selecting a color of the object, and stores the same in the RAM 13 (S26). The user selects, as a color of the object, the color of the ink 71 of the ink ribbon 7.

The CPU 11 specifies a display color of the object in the transparent area 601 according to the color of the object acquired in S26 and the color of the substrate designated in S23 or S25 (S27). Specifically, the CPU 11 specifies a color of the object by alpha blend when the object of the acquired color is superimposed on the substrate of the designated color, and sets the same as a display color of the object. The alpha blend is a drawing technique of superimposing a translucent foreground image (the object of the acquired color) on a background image (in the present embodiment, an image of the designated substrate color) by using RGB (RED GREEN BLUE) and a coefficient ($\alpha$ value) indicative of a light transmittance.

Since the light transmittance is different depending on the color of the ink 71 of the ink ribbon 7 (the color of the object), the a value is stored in advance in the ROM 12 according to the color of the object. Therefore, the CPU 11 performs the alpha blend by using the a value corresponding to the color of the object. The CPU 11 stores the specified display color of the object in the RAM 13.

The CPU 11 determines whether the OK button 164 is operated via the input unit 16 (S28). When it is determined that there is no operation on the OK button 164 (S28: NO), the CPU 11 returns to the processing of S22. When it is determined that there is an operation on the OK button 164 (S28: YES), the CPU 11 ends the display of the color setting screen 160 and returns to the main processing (refer to FIG. 4).

Figure 8:
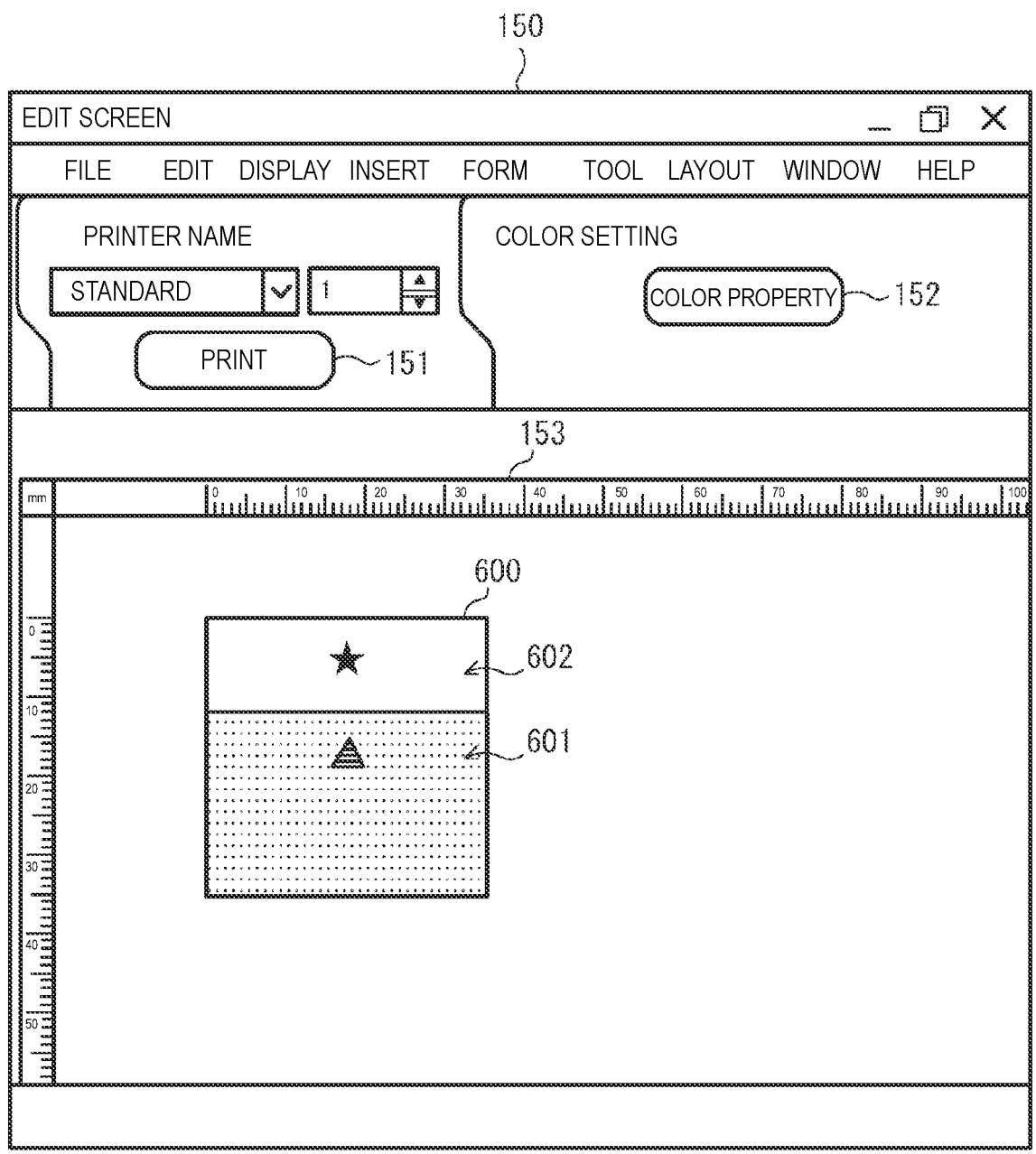
FIG. 8 illustrates an example of the edit screen 150 in which an edited result of a print content is reflected.

As shown in FIG. 4, the CPU 11 reflects the result of the processing in S14 or S15 stored in the RAM 13, in the edit screen 150 (refer to FIGS. 5 and 8) (S16). For example, as shown in FIG. 8, the opaque area 602 is displayed with the color of the ground paper 53 designated in S21. The transparent area 601 is displayed with the color of the substrate designated in the processing of S23 or S25 (refer to FIG. 6). The object "▲" in the transparent area 601 is displayed with the display color specified in the processing of S27 (refer to FIG. 6). In FIG. 8, the specified display color is shown with the horizontal lines.

The CPU 11 determines whether there is a print instruction for starting printing by the printer 2 (S17). The user inputs a print instruction to the printer 2 by operating the input unit 16 to select the print button 151 (refer to FIGS. 5 and 8).

When it is determined that there is no print instruction (S17: NO), the CPU 11 returns to the processing of S12. When it is determined that there is a print instruction (S17: YES), the CPU 11 transmits print data based on the fixed print content to the printer 2 (S18). The printer 2 performs a printing operation, based on the print data from the editor 1. Then, the CPU 11 ends the main processing.

As described above, the transparent area 601 is displayed with the color of the substrate designated in S23 or S25. That is, in the edited result of the print content on the edit screen 150, the color of the substrate is reflected in the transparent area 601 (refer to FIG. 8). For this reason, when the prepared label 60 is actually bonded to the substrate, both the background color of the object of the transparent part 61 and the color of the transparent area 601 in the label frame 600 in the edited result of the print content on the edit screen 150 become the same color, which is the color of the substrate. Therefore, the editor 1 can suppress a difference in appearance between the label 600 according to the edited result of the print content and the label 60 bonded to the substrate.

The label 6 is configured by the transparent part 61 and the opaque part 62. For this reason, when seeing the label 60 bonded to the substrate, the user can visually recognize the object printed on the label 60 with the substrate as a background in the transparent part 61, and visually recognize the object printed on the label 60 with the ground paper 53 as a background in the opaque part 62. When the label 60 is entirely transparent, the user visually recognizes the object printed on the label 60 with the substrate as a background over the entire label 60. For this reason, for example, when a substrate has a pattern drawn with a plurality of colors, it may be difficult for the user to visually recognize the object printed on the label 60. When a length of the label 60 in the width direction is greater than a length of an outer periphery of the cable 10, one end of the label 60 in the width direction is covered with the other end of the label 60 in the width direction from above. For this reason, when the label 60 is entirely opaque, the user may not visually recognize the object printed on one end of the label 60 in the width direction. That is, since the label 6 is configured by the transparent part 61 and the opaque part 62, the editor 1 can diversify uses of the label 60.

The object in the transparent area 601 is displayed with the specified display color according to the color of the object acquired in S26 and the color of the substrate designated in S23 or S25. That is, in the edited result of the print content on the edit screen 150, the color of the substrate is reflected in the object in the transparent area 601 (refer to FIG. 8). Therefore, the editor 1 can make the appearance of the label 600 according to the edited result of the print content closer to the appearance of the label 60 bonded to the substrate.

The CPU 11 can designate the color of the substrate, based on the image acquired from the digital camera 8. Therefore, the editor 1 can handle many types of substrates, as compared to a case where a plurality of types of patterns of a single color or form is stored in advance in the ROM 12, for example.

In the above embodiment, the CPU 11 corresponds to the "controller" and the "computer" of the present disclosure. The processing of displaying the label frame 600 in S11 and S16 of FIG. 4 corresponds to the "frame display processing" of the present disclosure. The processing of designating the color of the substrate in S23 and S25 of FIG. 6 corresponds to the "substrate color designating processing" of the present disclosure. The transparent part 61 corresponds to the "first part" of the present disclosure. The transparent area 601 corresponds to the "area" of the present disclosure. The processing of displaying the transparent area 601 in S16 of FIG. 4 with the color designated in S23 or S25 corresponds to the "substrate color display processing" of the present disclosure. The processing of displaying the object in the transparent area 601 in S11 and S16 of FIG. 4 corresponds to the "object display processing" of the present disclosure.

The opaque part 62 corresponds to the "second part" of the present disclosure. The processing of acquiring the color of the object in S26 of FIG. 6 corresponds to the "object color acquisition processing" of the present disclosure. The processing of specifying the display color of the object in S27 of FIG. 6 corresponds to the "specifying processing" of the present disclosure. The digital camera 8 corresponds to the "camera" of the present disclosure. The processing of acquiring an image from the digital camera 8 in S24 of FIG. 6 corresponds to the "image acquisition processing" of the present disclosure.

The present disclosure can be diversely changed from the above embodiment. For example, in the above embodiment, the editing system is configured by the editor 1 and the digital camera 8. Instead, the editor 1 may also be a personal computer having a camera mounted thereon, a smartphone having a camera mounted thereon, or the like. In this case, the editing system may not include the digital camera 8.

In the above embodiment, the editor 1 performs the main processing. Instead, the CPU of the printer 2 may perform the main processing. That is, the printer 2 may function as the editor 1, and the print content to the label 6 may be edited in the printer 2. In this case, the printer 2 may be mounted with a camera.

In the above embodiment, the color of the substrate is not limited to a single color. A pattern with a plurality of colors may be formed on the substrate. In the ROM 12, a plurality of types of form patterns such as wood grain, dots and the like may be stored in advance, and the user may select any one of the plurality of types of form patterns by operating the substrate color designating area 161 via the input unit 16. The CPU 11 may cut out a part corresponding to the substrate from an image acquired from the digital camera 8 and display the same in the transparent area 601. The part to be cut may be selected by the user or may be automatically selected based on well-known image recognition technology by the CPU 11.

The structure of the label 6 is not limited to the above embodiment. For example, the bonding tape 5 may be omitted. That is, the label 6 may be configured only by the print tape 4. In this case, the entire label becomes the transparent part 61, and the opaque part 62 is not provided. When bonding the label 60 to the substrate, the user may apply an adhesive to the print surface 41. The bonding tape 5 may be configured by a release paper having an adhesive layer, without the ground paper 53. In this case, the entire label becomes the transparent part 61, and the opaque part 62 is not provided. The bonding tape 5 may be bonded to the print surface 41 of the print tape 4 or may be bonded to an opposite surface to the print surface 41.

The using method of the label 60 is not limited to the above embodiment. That is, in the above embodiment, the cable 10 has been exemplified as the substrate. For example, the label 60 may be bonded to a plate. The plate is an example of the substrate.

In the above embodiment, when the transparent part 61 is transparent other than colorless transparent, the CPU 11 may specify the display color of the transparent area 601 by the alpha blend, according to the color of the transparent part 61 and the designated color of the substrate. In this case, the a value is determined based on the light transmittance of the transparent part 61, and is stored in advance in the ROM 12 according to a type of the label 6 (specifically, a type of the print tape 4).

In the above embodiment, the display color of the object in the opaque area 602 may be specified by the alpha blend, according to the color of the ground paper 53 designated in S21 and the color of the object acquired in S26. In this case, the CPU 11 displays the object in the opaque area 602 with the specified display color, in S16.

In the above embodiment, the processing of specifying the display color of the object may be omitted. That is, the object may be displayed with the designated color of the object.

In the above embodiment, the CPU 11 may acquire the color of the object from the printer 2 in S26, as follows. For example, the tape cassette 3 is provided with an identification part. The identification part is a QR Code (Trademark), a barcode, an unevenness pattern, an IC chip and the like, and indicates or records identification information such as a type of the label 6 (the color of the print tape 4 and the color of the ground paper 53), a color of the ink 71 of the ink ribbon 7, and the like. The printer 2 includes a reading device, and reads out the identification information from the identification part. The CPU 11 transmits a command for requesting the identification information to the printer 2. The CPU of the printer 2 transmits the identification information to the editor 1, in response to the command. In the editor 1, the CPU 11 specifies and designates a color of the print tape 4, a color of the ground paper 53, a color of the ink 71 of the ink ribbon 7, and the like, based on the identification information. The color of the ink 71 of the ink ribbon 7 is the color of the object.

In the ROM 12, a color of the substrate may also be stored according to a standard of the substrate. In this case, the editor 1 can specify a color of the substrate by acquiring information indicative of the standard of the substrate. For example, the user may operate the input unit 16 to directly input information indicative of the standard of the substrate to the editor 1. The editor 1 may also acquire the information indicative of the standard of the substrate, as follows. The user captures a character string, a QR Code (Trademark) and the like indicative of the standard of the substrate by using the digital camera 8. The editor 1 acquires the captured image, and specifies the standard of the substrate based on the acquired image by using the image recognition technology.

Instead of the CPU 11, a microcomputer, an ASIC (Application Specific Integrated Circuits), an FPGA (Field Programmable Gate Array) and the like may also be used as the processor. The main processing may also be processed in a distributed manner by a plurality of processors. The non-transient storage medium such as the ROM 12, the flash memory 14 and the like may be a storage medium capable of leaving therein information, irrespective of a time period for which the information is stored. The non-transient storage medium may not include a transient storage medium (for example, a signal to be transmitted). The program may be downloaded (i.e., transmitted as a transmission signal) from a server connected to a network and stored in the flash memory 14, for example. In this case, the program may be preserved in a non-transient storage medium such as a hard disk drive provided to the server. Note that, the above modified embodiments may be combined with each other without any contradiction.

What is claimed is:

1. An editor comprising:
a controller configured to control a display of an edit screen for editing a print content to a tape to prepare a label having an object printed on the tape and a light transmission at least in a part of the label,
wherein the controller is configured to perform:
frame display processing of displaying, on the edit screen, a label frame indicative of an outer shape of the label;
substrate color designating processing of designating a color of a substrate on which the label is arranged;
substrate color display processing of displaying an area in the label frame corresponding to a first part having a light transmission of the label with a color of the substrate designated in the substrate color designating processing;
object color acquisition processing of acquiring a color of the object;
specifying processing of specifying a display color of the object according to a color of the object acquired in the object color acquisition processing and a color of the substrate designated in the substrate color designating processing, in which the object of the color acquired in the object color acquisition processing is superimposed on the substrate of the color designated in the substrate color display processing; and
object display processing of displaying the object with the display color specified in the specifying processing in the area.

2. The editor according to claim 1,
wherein the tape is configured by the first part and a second part having no light transmission, the first part and the second part extending in an elongated direction of the tape and being arranged side by side in a width direction of the tape.

3. The editor according to claim 2,
wherein the controller is configured to perform image acquisition processing of acquiring an image captured by a camera, and
the controller is configured to perform the substrate color designating processing to designate a color of the substrate based on the image acquired in the image acquisition processing.

4. The editor according to claim 1,
wherein the controller is configured to perform image acquisition processing of acquiring an image captured by a camera, and
the controller is configured to perform the substrate color designating processing to designate a color of the substrate based on the image acquired in the image acquisition processing.

5. An editing system comprising:
an editor including a controller; and
a camera,
wherein the controller of the editor is configured to control a display of an edit screen for editing a print content to a tape to prepare a label having an object printed on the tape and a light transmission at least in a part of the label, and
the controller is configured to perform:
image acquisition processing of acquiring an image captured by the camera;
frame display processing of displaying, on the edit screen, a label frame indicative of an outer shape of the label;
substrate color designating processing of designating a color of a substrate on which the label is arranged based on the image acquired in the image acquisition processing;
substrate color display processing of displaying an area in the label frame corresponding to a first part having a light transmission of the label with a color of the substrate designated in the substrate color designating processing; and
object display processing of displaying the object in the area.

6. A non-transitory computer-readable storage medium storing a computer program, when executed by a computer of an editor configured to control a display of an edit screen for editing a print content to a tape to prepare a label having an object printed on the tape and a light transmission at least in a part of the label, the computer program being configured to cause the editor to perform:

frame display processing of displaying, on the edit screen, a label frame indicative of an outer shape of the label;

substrate color designating processing of designating a color of a substrate on which the label is arranged;

substrate color display processing of displaying an area in the label frame corresponding to a first part having a light transmission of the label with a color of the substrate designated in the substrate color designating processing;

object color acquisition processing of acquiring a color of the object;

specifying processing of specifying a display color of the object according to a color of the object acquired in the object color acquisition processing and a color of the substrate designated in the substrate color designating processing, in which the object of the color acquired in the object color acquisition processing is superimposed on the substrate of the color designated in the substrate color display processing; and object display processing of displaying the object with the display color specified in the specifying processing in the area.

\* \* \* \* \*